United States Patent [19]

Clark

[11] Patent Number: 5,668,217
[45] Date of Patent: Sep. 16, 1997

[54] AMIDOAMINE MODIFICATION OF POLYPROPYLENE

[75] Inventor: Richard James Clark, Austin, Tex.

[73] Assignee: Huntsman Petrochemical Corporation, Austin, Tex.

[21] Appl. No.: 648,917

[22] Filed: May 16, 1996

[51] Int. Cl.$^6$ ........................................ C08F 8/32
[52] U.S. Cl. .......................... 525/194; 525/207; 525/221
[58] Field of Search .................................. 525/194, 207, 525/221

[56] References Cited

U.S. PATENT DOCUMENTS

| | | | |
|---|---|---|---|
| 3,320,226 | 5/1967 | Cappuccio et al. | 260/93.7 |
| 3,654,370 | 4/1972 | Yeakey | 260/584 B |
| 4,039,461 | 8/1977 | Hankins et al. | 252/51.5 A |
| 4,137,185 | 1/1979 | Gardiner et al. | 252/33 |
| 4,179,164 | 12/1979 | Konishi et al. | 303/24 F |
| 4,505,834 | 3/1985 | Papay et al. | 252/51.5 A |
| 4,520,171 | 5/1985 | Diveley et al. | 525/279 |
| 4,632,769 | 12/1986 | Gutierrez et al. | 252/48.6 |
| 4,636,436 | 1/1987 | Clementini et al. | 428/364 |
| 4,678,834 | 7/1987 | Boivin et al. | 525/74 |
| 4,710,540 | 12/1987 | McAlpin et al. | 525/101 |
| 4,753,997 | 6/1988 | Shyu et al. | 525/259 |
| 4,795,782 | 1/1989 | Lutz et al. | 525/66 |
| 4,822,688 | 4/1989 | Nogues | 428/458 |
| 4,857,595 | 8/1989 | Kazmierzak et al. | 525/142 |
| 4,861,812 | 8/1989 | McAlpin et al. | 524/3 |
| 4,902,749 | 2/1990 | Akkapeddi et al. | 525/66 |
| 4,952,631 | 8/1990 | McAlpin et al. | 525/101 |
| 4,981,896 | 1/1991 | Okada et al. | 524/413 |
| 4,994,503 | 2/1991 | Harris et al. | 521/137 |
| 5,006,601 | 4/1991 | Lutz et al. | 525/66 |
| 5,010,119 | 4/1991 | McElrath, Jr. et al. | 523/205 |
| 5,073,600 | 12/1991 | Gorman et al. | 525/264 |
| 5,115,018 | 5/1992 | Akkapeddi et al. | 525/64 |
| 5,208,081 | 5/1993 | Gübitz et al. | 428/31 |
| 5,210,134 | 5/1993 | Akkapeddi et al. | 525/64 |
| 5,225,483 | 7/1993 | Datta et al. | 525/73 |
| 5,244,971 | 9/1993 | Jean-Marc | 525/64 |
| 5,254,668 | 10/1993 | Dominguez et al. | 538/323 |
| 5,346,951 | 9/1994 | Suwada | 525/64 |
| 5,364,909 | 11/1994 | Guo et al. | 525/69 |
| 5,369,170 | 11/1994 | Weinkauf | 525/64 |
| 5,373,048 | 12/1994 | Witzeman et al. | 524/458 |
| 5,384,375 | 1/1995 | Roberts | 525/327.6 |
| 5,393,824 | 2/1995 | Roberts | 524/531 |

FOREIGN PATENT DOCUMENTS

| | | |
|---|---|---|
| 1184554 | 3/1985 | Canada . |
| 0061889 | 10/1982 | European Pat. Off. . |
| 0 662 496 A2 | 7/1995 | European Pat. Off. . |
| 2 115 046 | 10/1971 | Germany . |
| 60-195120 | 10/1985 | Japan . |
| 2-237943 | 9/1990 | Japan . |
| 7-053812 | 2/1995 | Japan . |
| 2156364 | 10/1985 | United Kingdom . |
| WO89/08120 | 9/1989 | WIPO . |
| WO93/24938 | 12/1993 | WIPO . |

OTHER PUBLICATIONS

Dagli et al., "Process Requirements of the Reactive Compatibilization of Nylon 6/Polypropylene Blends," Polymer Processing Institute at Stevens Institute of Technology, Hoboken NJ.

Clark and Henkee, "Poly(ether Amide) Triblock and Star Block Copolymers," *ANTEC*, pp. 3408–3412, May 1994.

Clark et al., "Poly (Amide Ether Amide) Linear Triblock and Star Block Copolymers," *ANTEC*, pp. 2836–2841, May 1993.

*Primary Examiner*—Bernard Lipman
*Attorney, Agent, or Firm*—Russell R. Stolle; Ron D. Brown; Robert M. O'Keefe

[57] ABSTRACT

A composition comprising a blend of polypropylene with the reaction product of a functionalized polypropylene and an amidoamine is disclosed. The composition may be produced by combining polypropylene, functionalized polypropylene and an amidoamine in an extruder, and may also include an elastomer or other additives.

29 Claims, No Drawings

AMIDOAMINE MODIFICATION OF POLYPROPYLENE

BACKGROUND OF THE INVENTION

This invention relates to an olefin polymer composed of the reaction product of a functionalized polypropylene and a amidoamine. This invention also relates to thermoplastic resin blends containing the olefin polymer and polypropylene.

The in situ formation of compatibilizers for polyblends is rapidly gaining popularity. In the last few years, more and more cases have been reported where advantage is taken of the presence of reactive groups to form a graft or a block or a random copolymer, which could act as a compatibilizer for a mixture of two or more polymers. For example, *Process Requirements of the Reactive Compatibilization of Nylon 6/Polypropylene Blends* by S. S. Dagli, M. Xanthos and J. A. Biensenberger: Polymer Processing Institute at Stevens Institute of Technology, Hoboken, N.J. 07030 reveals an acrylic acid grafted modified polypropylene used with a blend of nylon-6 and polypropylene.

Thermoplastic resin compositions containing polypropylene are well known in the art (e.g. U.S. Pat. No. 5,208,081). U.S. Pat. No. 5,179,164 describes a polypropylene/polyamide composition suitable for producing moldings. The patent describes an ethylene copolymer useful as an adhesion promoter. Moreover, the patent indicates that maleic acid is a suitable monomer for preparing the ethylene copolymer.

European patent application 0 367 832 discloses a resin composition containing an olefinic polymer having acid anhydride groups. As in U.S. Pat. No. 5,179,164, the novel compound is blended with a polyamide.

Although the compositions of the above-mentioned patents take advantage of copolymers to alter some properties of thermoplastic resin compositions, they do not succeed in significantly improving the resilience of the resin to meet requirements for high impact applications. Hence, it would be desirable to develop a copolymer blend that would significantly improve the impact resistance and modify the water absorbance and melt rheology of the resin compositions.

SUMMARY OF THE INVENTION

The present invention provides a solution to one or more disadvantages described above or otherwise known to one skilled in the art.

In one broad respect, this invention is a composition useful for the preparation of molded articles comprising polypropylene and the reaction product of a functionalized polypropylene and an amidoamine.

In another respect, this invention is a process for making a composition, comprising compounding polypropylene, a functionalized polypropylene and an amidoamine, such that the functionalized polypropylene and the amidoamine form a reaction product.

In another respect, this invention is a process for making a composition, comprising compounding polypropylene with the reaction product of a functionalized polypropylene and an amidoamine.

The compositions of the present invention are useful for preparing molded automotive body parts, including thermoplastic polyolefins ("TPO") based automotive body parts. It is also contemplated that the compositions are useful for making molded parts that contain filler such as glass. It is yet further contemplated that the compositions of the present invention may be useful in the preparation of films, including printable films; fibers including diable and non-woven polypropylene fibers; and in packaging materials for electronics components such as semiconductor chips, wherein the packaging materials may provide electrostatic dissipation which would thereby protect the chips from damage. It is yet further contemplated that the composition of the present invention may be useful to improve the barrier properties for polyethylene and to modify polyethylene as a tie layer in multilayer films. It is further contemplated that the composition of the present invention may be useful as an additive as polypropylene based reinforcement fibers for concrete.

DESCRIPTION OF THE PREFERRED EMBODIMENT

In the present invention, polypropylene ("PP") is blended with the reaction product of maleated polypropylene and amidoamine to achieve improved impact resistance and excellent mold flowability over blends of polypropylene and maleated polypropylene.

Plastics are increasingly being employed in the production of motor vehicles. Impact-modified PP has proved to be particularly suitable for applications such as bumpers, spoilers, fenders, side bump strips and the like. Therefore, a thermoplastic resin blend having the improved properties of the instant invention has significant potential commercial usefulness.

These resin compositions, according to the present invention, are useful as engineering plastics which are materials for structural members in the fields of transport machines (automobiles, ships and the like), apparatus, tools, electronic appliances, electric appliances, sporting goods, leisure goods and the like; and for connectors, tubes and the like.

Suitable polypropylenes are known from polymer chemistry, are described for example in Kunststoff-Handbuch, volume IV, Polyolefins, edited by R. Vieweg, A. Schley and A. Schwarz. Carol Hanser Verlag, Munich, 1969, and are commercially available, so that no details need be given.

Functionalized PP is PP onto which a monomer has been grafted. The usual method of such grafting is by free radical reaction. In the practice of this invention, the maleated polypropylene is not a copolymer of maleic anhydride or equivalent thereof, and propylene, such that the maleic anhydride moiety is predominantly in the backbone of the copolymer. Suitable monomers for preparing other functionalized polypropylenes are, for example, olefinically unsaturated monocarboxylic acids of less than 12 carbon atoms, e.g., acrylic acid or methacrylic acid, and the corresponding tert-butyl esters, e.g., tert-butyl (meth)acrylate, olefinically unsaturated dicarboxylic acids of less than 12 carbon atoms, e.g., fumaric acid, maleic acid, and itaconic acid and the corresponding mono-and/or di-tert-butyl esters, e.g., mono- or di-tert-butyl fumarate and mono- or di-tert-butyl maleate, olefinically unsaturated dicarboxylic anhydrides of less than 12 carbon atoms, e.g., maleic anhydride, sulfo- or sulfonyl-containing olefinically unsaturated monomers of less than 12 carbon atoms, e.g., p-styrenesulfonic acid, 2-(meth) acrylamide-2-methylpropenesulfonic acid or 2-sulfonyl (meth)acrylate, oxazolinyl-containing olefinically unsaturated monomers of less than 12 carbon atoms, e.g., vinyloxazolines and vinyloxazoline derivatives, and epoxy-containing olefinically unsaturated monomers of less than 12 carbon atoms, e.g., glycidyl (meth)acrylate or allyl glycidyl ether. The most preferred monomer for preparing functionalized polypropylene is maleic anhydride.

The functionalized polypropylene used in the practice of this invention may have a wide variety of number average molecular weights. When the functionalized polypropylene is used to make paintable articles, such as automotive body parts, the functionalized polypropylene preferably has a number average molecular weight greater than about 3,000 and preferably less than about 20,000, more preferably less than about 10,000. A representative example of a maleated polypropylene that is currently commercially available is under the name EPOLENE E-43, available from Eastman Chemical. Such relatively low molecular weight functionalized polypropylenes, when reacted with amidoamines in accordance with the practice of this invention, appears to render the resulting extruded compositions more readily paintable. In other applications wherein the functionalized polypropylene is employed, such as when a glass filler is added to increase stiffness and strength, a higher average number molecular weight greater than about 40,000 and less than about 60,000 may be employed. Generally, glass filler and polypropylene are not miscible, and their combination commonly leads to voids in the resulting compositions. The relatively higher molecular weight materials "wet" the glass to make the glass filler particles and polypropylene more combinable to thereby decrease the amount of voids in the resulting compositions.

The amidoamines of the present invention can be prepared using the techniques described in U.S. Pat. No. 5,254,668 which is incorporated herein by reference. Generally, the amidoamine is made by reacting caprolactam, laurolactam or another cyclic lactam with a polyetheramine. The mole ratio of cyclic lactam to polyetheramine may range from a few to very many, and a heterogenous or homogenous acid catalyst may be employed. Water may be used to control the speed of the reaction and the molecular weight of the amidoamine product.

In one embodiment of this invention, the amidoamines have the formula:

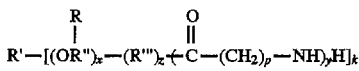

where R is independently hydrogen or lower alkyl of 1 to 4 carbon atoms; R' is an alkylene group of 2 to 18 carbon atoms; R" is independently lower alkylene of 2 to 4 carbon atoms, thereby encompassing ethylene oxide, propylene oxide and butylene oxide moieties in random or block groups; R'" is independently straight or branched lower alkylene of 2 to 6 carbon atoms, thereby encompassing ethylene, propylene, butylene, etc. moieties in random or block groups; y is independently 1 to 300; p is independently 2 to 11; x is independently 1 to 200; z is independently 0 to 200; and k is from 1 to 8. The x and z groups may be distributed in blocks or randomly, and are understood not to necessarily appear in the order depicted when both are presented, that is, either the alkoxy x or the alkylene z groups may be closest to the amide groups. In another embodiment of this invention R' is an alkylene group of 2 to 10 carbon atoms; y is independently 1 to 150; p is independently 5 to 11; x is independently 1 to 120; z is independently 0 to 120; and k is from 1 to 5. Preferably, R' is an alkylene group of 2 to 6 carbon atoms; y is independently 1 to 125; p is independently 5 to 11; x is independently 1 to 100; z is independently 0 to 100; and k is from 1 to 3. In one embodiment of the invention, x is at least 1; in another embodiment, z is at least 1. In still another embodiment of the invention, k is 1, or k is 2, or k is at least 3.

In another embodiment of this invention the amidoamines have the formula:

| GLOSSARY |
|---|
| JEFFAMINE M-1000 |
| 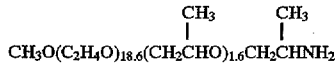 |
| JEFFAMINE M-2070 and JEFFAMINE M-2005 |
| 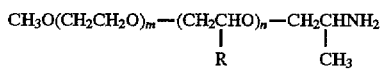 |
| where R = H, CH$_3$, m is from about 3 to 32, and n is from about 10 to 32. |
| JEFFAMINE D-2000, JEFFAMINE D-4000 and JEFFAMINE D-400 |
| 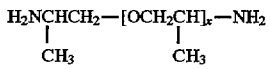 |
| where x is about 33 for D-2000, x is about 68 for D-4000 and x is about 5.6 for D-400. |
| JEFFAMINE ED-600, JEFFAMINE ED-900, JEFFAMINE ED-2001, JEFFAMINE ED-2003, JEFFAMINE ED-4000, and JEFFAMINE ED-6000 |
| 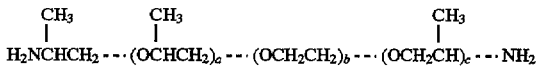 |
| where b is about 8.5 and a + c is about 2.5 for ED-600, b is about 15.5 and a + c is about 2.5 for ED-900, b is about 40.5 and a + c is about 2.5 for ED-2001, b is about 86.0 and a + c is about 2.5 for ED-4000, and b is about 132.0 and a + c is about 3.0 for ED-6000. |
| JEFFAMINE T-3000 and JEFFAMINE T-5000 |
| 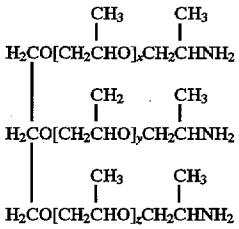 |
| where x + y + z = 50 for T-3000 and x + y + z = 83 for T-5000. |
| JEFFAMINE ET-3000 |
| 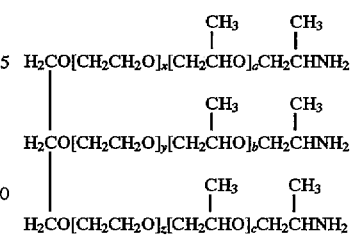 |
| where x + y + z = 57 and a + b + c = 4. | where
R is independently hydrogen or lower alkyl of 1 to 4 carbon atoms;

R' is an alkyl group of 2 to 18 carbon atoms;
R" is independently lower alkylene of 2 to 4 carbon atoms;
x is independently 1 to 200;
y is independently 1 to 150; and
p is independently 5 to 11.

In still another embodiment of this invention the amidoamines have the formula:

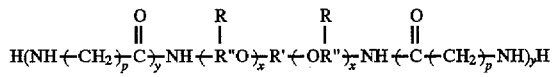

where

R is independently hydrogen or lower alkyl of 1 to 4 carbon atoms;
R' is an alkyl group of 2 to 18 carbon atoms;
R" is independently lower alkylene of 2 to 4 carbon atoms;
x is independently 1 to 200;
y is independently 1 to 150; and
p is independently 5 to 11.

In yet still another embodiment of this invention the amidoamines have the formula:

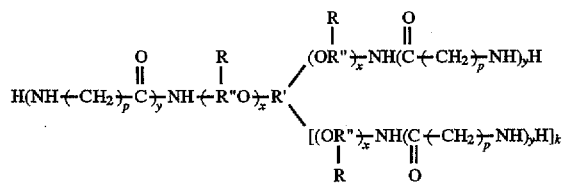

where

R is independently hydrogen or lower alkyl of 1 to 4 carbon atoms;
R' is an alkyl group of 2 to 18 carbon atoms;
R" is independently lower alkylene of 2 to 4 carbon atoms;
x is independently 1 to 200;
y is independently 1 to 150;
p is independently 5 to 11; and
k is from 1 to 6.

In a preferred embodiment of this invention the amidoamines have the formula:

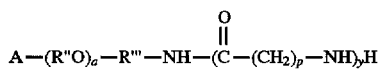

wherein:
A=B or D, and

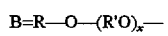

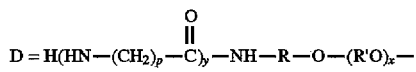

and wherein:
R is an alkyl of 1 carbon when A=B;
R' is an alkyl of 2 carbons when A=B;
R is a straight or branched alkyl of 0 or 3 carbon atoms when A=D;
R' is an alkyl group of 0 or 2 carbon atoms when A=D;
R" is a branched alkyl group of 3 carbon atoms;
R'" is a branched alkyl group of 3 carbon atoms;
a is independently 1 to 200;
x is independently 1 to 200;
y is independently 1 to 300; and
p is independently 2 to 11.

Suitable cyclic lactams for forming amidoamine endblocks are those having from 2 to about 11 methyl groups. Preferred cyclic lactams have from about 5 to about 11 methyl groups. A more preferred cyclic lactam is caprolactam, having 5 methyl groups. Also preferred is laurolactam. The cyclic lactam may react with a polyetheramine to form polylactam endblocks on the amidoamine having from about 2 to about 300 lactam groups. In one preferred embodiment, caprolactam reacts with a polyetheramine to form a amidoamine having polycaprolactam (i.e. nylon 6) endblocks.

Suitable polyether blocks for the amidoamines include polyethylene glycol, polypropylene glycol, copolymers of polyethylene glycol and polypropylene glycol, poly(1,2-butylene glycol), and poly(tetramethylene glycol). The glycols can be aminated using well known methods to produce the polyetheramines that are in turn to be reacted with a cyclic lactam. Generally, the glycols are prepared from ethylene oxide, propylene oxide, butylene oxide or combination thereof using well known methods such as by a methoxy or hydroxy initiated reaction. When more than one oxide is used, the oxides can be reacted simultaneously when a random polyether is desired, or reacted sequentially when a block polyether is desired.

In one embodiment of the present invention, the polyetheramines used to make the amidoamines of the present invention are prepared from ethylene oxide, propylene oxide or combinations thereof. Any combination of ethylene oxide and propylene oxide will work, however, the ratio of ethylene oxide to propylene oxide may be tailored to control water absorption. Generally, the amount of ethylene oxide on a molar basis is greater than about 50 percent of the polyetheramine, preferably greater than about 75 percent and more preferably greater than about 90 percent. In one embodiment of this invention, polyols and amines including polyalkylene polyamines and alkanol amines or any amine that is not a polyetheramine as disclosed herein may be absent from the composition. Similarly, functional groups other than ether linkages and amine groups may be absent from the polyetheramine.

Preferred amidoamines include those described in U.S. Pat. No. 5,254,668. These amidoamines are poly(ether amide) diblock, poly(amide ether amide) triblock and three arm, poly(ether amide) starblock copolymers prepared by reacting a cyclic lactam with mono-, di- or tri-functional amine terminated polyethers. Suitable monoamines include JEFFAMINE M-600, JEFFAMINE M-1000, JEFFAMINE M-2070, and JEFFAMINE M-2005. Suitable diamines that may be used to create triblock copolymers include JEFFAMINE ED-6000, JEFFAMINE ED-4000, JEFFAMINE ED-2001, JEFFAMINE D-2000, JEFFAMINE D-4000, JEFFAMINE ED-900, JEFFAMINE ED-600, JEFFAMINE D-400, JEFFAMINE EDR-148, JEFFAMINE EDR-192 and BASF Poly. Suitable triamines that may be used to create starblock polymers include JEFFAMINE ET-3000, JEFFAMINE T-403, JEFFAMINE T-3000 and JEFFAMINE T-5000. The structural formulas of some of these polyetheramines can be found in the Glossary. These polyetheramines may be incorporated into the amidoamine copolymer at levels ranging from about 2% to about 40%, preferably from about 2% to about 20%.

Preferred amidoamines are those diblock, triblock and starblock copolymers formed by reacting caprolactam with a polyetheramine and are characterized by having poly(propylene glycol) or poly(ethylene glycol) based midblocks and caprolactam based endblocks. More preferred amidoamines include triblock copolymers having from about a 148 gm/mol to about a 6000 gm/mol poly(propylene glycol)

based midblock and caprolactam based endblocks. An even more preferred amidoamine is a triblock copolymer prepared by reacting caprolactam with from about 2% to 20% of about 2000 gm/mol, primary amine terminated poly (propylene glycol) diamine (JEFFAMINE D-2000). Also more preferred is a triblock copolymer amidoamine prepared by reacting caprolactam with from about 2% to about 20% of about 2000 gm/mol, primary amine terminated poly (ethylene glycol) diamine (JEFFAMINE ED-2003).

The mixing of the functionalized PP and amidoamine and optionally also PP may be carried out in a customary mixing apparatus including batch mixers, continuous mixers, kneaders, and extruders. For most applications, the preferred mixing apparatus is an extruder. As described above, the preferred functionalized polypropylene used in the blend is maleated polypropylene. The preferred amidoamines used in the blend are diblock copolymers containing from about 2% to about 40% of about 600 gm/mol to about 2100 gm/mol primary amine terminated poly(propylene glycol) monoamine, triblock copolymers containing from about 2% to about 40% of about 148 gm/mol to about 6000 gm/mol primary amine terminated poly(propylene glycol) diamine, and starblock amidoamines containing from about 2% to about 40% of about 400 gm/mol to about 5000 gm/mol primary amine terminated poly(propylene glycol) triamine. A more preferred amidoamine used in the blend is a triblock copolymer containing from about 2% to about 20% of about 2000 gm/mol primary amine terminated poly(propylene glycol) diamine. Also more preferred is a triblock copolymer amidoamine containing from about 2% to about 20% of about 2000 gm/mol primary amine terminated poly(ethylene glycol) diamine.

Besides the PP/functionalized-PP/amidoamine structural components according to the invention, the resin composition may, to improve the impact strength, contain impact modifiers, advantageously impact-modifying elastomers. Impact-modifying elastomers for the instant invention are known to a skilled worker. Examples are rubbers based on ethylene, propylene, butadiene, and acrylates, e.g. methacrylates, or mixtures thereof. Other examples include EP and EPDM rubbers, with EP rubber (ethylene propylene rubber) being preferred in applications where automotive body parts are being prepared. A representative example of a currently commercially available EP rubber is sold under the name VISTALON 878 by Exxon Chemical.

Suitable impact-modifying elastomers are described for example in Methoden der organischen Chemie (Houben-Weyl), volume XIV/1, Makromolekulare Chemie (Georg-Thieme-Verlag, Stuttgart, 1961), pages 390 to 406, and in the monograph by C. B. Bucknal, Toughened Plastics (Applied Publishers, London, 1977).

A composition containing polypropylene and elastomers, such as EP rubber, is commonly referred to as a "TPO," which stands for thermoplastic polyolefin. TPO's are commonly used in the manufacture of molded automotive body pans, such as bumper fascias. Such molded parts may also contain other components such as fillers, as described hereinbelow. TPO-based compositions can be prepared in the same manner as for non-elastomer-containing compositions. TPO's are commonly sold in compounded or reactor grades.

It is contemplated that the amidoamine and functionalized polypropylene, and optionally a small amount of PP or TPO, can be reacted to form a reaction product concentrate and, later, the reaction product concentrate can be blended with polypropylene or TPO. In this aspect of the invention, the amidoamine comprises from about 10 to about 50 weight percent of the concentrate. When the reaction product of amidoamine and maleated PP is prepared neat, the reaction product can be blended or compounded with polypropylene or TPO and any other components of the desired composition to the desired levels using a mixing apparatus such as an extruder. It should be understood that PP may be commonly used to dilute the reaction. Depending on the type of mixer, the reaction product, polypropylene and any other components can be thoroughly mixed as solids prior to introducing the admixture in the mixing apparatus. Alternatively, mixers are available which will mix the components during operation. In either case, during operation of the mixer, the components are heated to melt the solids, with the melted components being thereafter mixed to form the final composition.

In addition to the structural components of PP, functionalized-PP, amidoamine and any impact modifier contained in a resin composition according to the instant invention, the resin may also contain reinforcing agents and/or additives. The reinforcing agents used may be reinforcing fillers, for example, carbon or carbon fibers; clay, chalk, talc, and mica to control shrinkage and control coefficient of thermal expansion; glass (beads or fibers) to increase stiffness. Further, the fillers may be finished with adhesion promoters and/or sizing agents. In addition, phosphite or hindered phenol or both can be added as a stabilizer (as a free radical scavenger).

When compositions include a glass filler, the composition can contain up to about 40% glass filler if highly stiff compositions are desired. More typically, from about 2% to about 10% glass filler in the composition is employed. Advantageously, the compositions of the present invention that contain glass filler generally are substantially free of voids that typically develop in compositions containing polypropylene and glass. In this aspect of the invention, it is preferred to employ maleated polypropylene having an average molecular weight of about 6,000 to about 60,000, as is described hereinabove.

Suitable resin compositions may contain from about 1% to about 90 wt % PP, from about 0.5 to about 10 wt % maleated PP and from about 1 to about 90 wt % amidoamine. When the compositions include elastomers, such as in TPO-based compositions used to make automotive body parts, the compositions generally comprise from about 0.5 about 40 wt % maleated PP, from about 5 to about 30 wt % amidoamine and from about 50 to about 93 wt % PP, such percentages based on the weights of these components of the composition. Preferred compositions that include elastomers comprise about 15 to about 30 wt % maleated PP, from about 20 to about 30 wt % amidoamine and from about 62 to about 83 wt % PP.

The preferred customary mixing apparatus is an extruder in which the amidoamine reacts with the maleated polypropylene to form a reaction product at from about 230° C. to about 300° C. in the course of a residence time of from about 25 to about 300 seconds. For typical compositions of this invention, degradation begins to occur above this temperature range and below this range the compositions generally do not melt. Polypropylene is a non-reactive component of the mixing blend. The preferred temperature range is from about 240° C. to about 260° C.

In the examples, continuous compounding was carried out in a Haake 0.75 inch single screw extruder, having a 20:1 L/D barrel configuration in which the feed sequence was a combined feed with all the components being fed at the same location (hopper of the extruder).

The following examples are illustrative of the invention and should not be construed as limiting the scope of the invention or claims thereof. In the examples, a stoichiometric excess of maleic functionality on the maleated polypropylene is used relative to the amount of amine functionality on the amidoamine.

EXAMPLES 1–3

Blends of polypropylene, maleated polypropylene and amidoamine were produced in a single screw extruder. For each blend, the amidoamine used was a triblock copolymer that has a 2000 gm/mol polypropylene glycol based midblock and nylon 6 end blocks. The terminal amine groups of this amidoamine are available to react with the maleic anhydride group of the maleated propylene to stabilize the blend morphology. In order to illustrate the effect of the amidoamine on the properties of the extruded resin, only the concentration and characteristics of amidoamine was varied.

Test specimens were injection molded and tested after two days of conditioning at 72° F., 50% relative humidity. Characteristics of these specimens are shown in Table 1.

TABLE 1

POLYPROPYLENE/AMIDOAMINE BLENDS

|  | EXAMPLE 1 | EXAMPLE 2 | EXAMPLE 3 |
|---|---|---|---|
| COMPONENTS | | | |
| Polypropylene | 64.7% | 64.7% | 64.7% |
| Maleated Polypropylene | 10.0% | 10.0% | 10.0% |
| Nylon 6 | 25.0% | — | — |
| Amidoamine 25% Polyether | — | 25.0% | — |
| Amidoamine 35% Polyether | — | — | 25.0% |
| Hindered Phenol | 0.3% | 0.3% | 0.3% |
| PHYSICAL PROPERTIES | | | |
| Flexural Modulus, MPa | 1680 | 1577 | 1377 |
| Stress at Yield, MPa | 57 | 51 | 44 |
| Tensile Elongation, % | 14 | 13 | 41 |
| Tensile Modulus, MPa | 998 | 856 | 740 |
| Notched Izod Impact, J/m | 22 | 40 | 53 |
| Unnotched Izod Impact, J/m | 695 | 1188 | 1359 |

Examples 1–3 demonstrate that as the amount of amine terminated polyether is increased in the block copolymer, both the notched and unnotched izod performance increases significantly. Tensile elongation remains relatively constant until 25% of amidoamine having 35% polyether is incorporated. At this point, the tensile elongation begins to increase. Measurements of flexural modulus, tensile modulus and yield stress drop with the addition of the block copolymer as well as with an increase in the amount of polyether contained in the copolymer.

Compositions prepared in accordance with the present invention may be used to prepare molded articles of manufacture using conventional, well known, molding techniques under standard conditions. For instance, standard injection molding techniques may be employed. Certain compositions (blends) of the present invention have surprisingly been found to have improved flowability characteristics during injection molding of TPO-based compositions such that less pressure may be used when injecting the melted compositions into a mold, as compared to compositions in which amidoamine is absent. The desired shape of the molded article may vary depending on end use of the article. For instance, rubber containing compositions of the present invention may be injection molded to manufacture automotive body parts such as bumper fascias, if desired.

Although the invention has been described by reference to preferred embodiments, it is not intended that the novel compositions or processes be limited thereby but various modifications are intended to be included as falling within the spirit and broad scope of the foregoing disclosure and the following claims.

GLOSSARY

JEFFAMINE M-1000

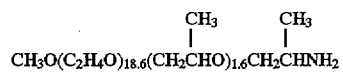

JEFFAMINE M-2070 and JEFFAMINE M-2005

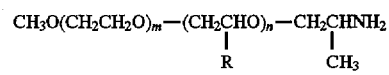

where R = H, CH$_3$, m is from about 3 to 32, and n is from about 10 to 32.

JEFFAMINE D-2000, JEFFAMINE D-4000 and JEFFAMINE D-400

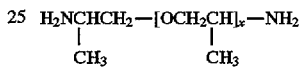

where x is about 33 for D-2000, x is about 68 for D-4000 and x is about 5.6 for D-400.

JEFFAMINE ED-600, JEFFAMINE ED-900, JEFFAMINE ED-2001, JEFFAMINE ED-2003, JEFFAMINE ED-4000, and JEFFAMINE ED-6000

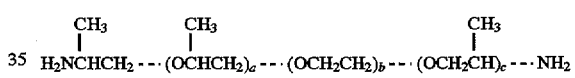

where b is about 8.5 and a + c is about 2.5 for ED-600, b is about 15.5 and a + c is about 2.5 for ED-900, b is about 40.5 and a + c is about 2.5 for ED-2001, b is about 86.0 and a + c is about 2.5 for ED-4000, and b is about 132.0 and a + c is about 3.0 for ED-6000.

JEFFAMINE T-3000 and JEFFAMINE T-5000

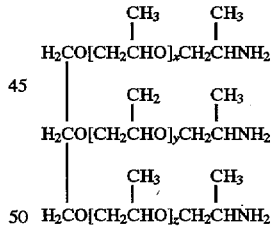

where x + y + z = 50 for T-3000 and x + y + z = 83 for T-5000.

JEFFAMINE ET-3000

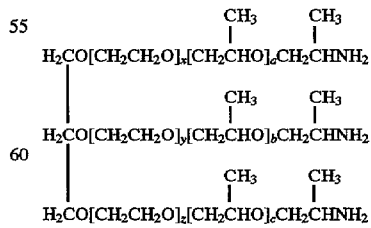

where x + y + z = 57 and a + b + c = 4.

What is claimed is:

1. A composition useful for the preparation of molded articles comprising polypropylene and the reaction product of a functionalized polypropylene and an amidoamine, wherein the amidoamine has the formula:

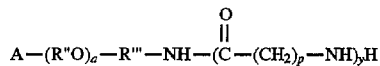

wherein:

A=B or D, and

B=R—O—(R'O)$_x$—

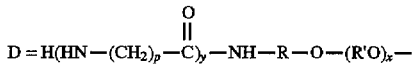

R is an alkyl of 1 carbon when A=B;

R' is an alkyl of 2 carbons when A=B;

R is a straight or branched alkyl of 0 to 3 carbon atoms when A=D;

R' is an alkyl group of 0 or 2 carbon atoms when A=D;

R" is a branched alkyl group of 3 carbon atoms;

R'" is a branched alkyl group of 3 carbon atoms;

a is independently 1 to 200;

x is independently 1 to 200 y is independently 1 to 300; and p is independently 2 to 11.

2. The composition of claim 1 wherein the functionalized polypropylene is maleated polypropylene.

3. The composition of claim 1 wherein the amidoamine is derived from the reaction of caprolactam and a polyetheramine selected from the group consisting of monoamines, diamines and triamines having a molecular weight of from about 148 to about 6000.

4. The composition of claim 2, wherein the polypropylene is in an amount in the range of from about 1 to about 90 wt %, the maleated polypropylene is in an amount of from about 0.5 to about 10 wt % and the amidoamine is in an amount of from about 1 to about 90 wt % of amidoamine.

5. The composition of claim 1, further comprising an elastomer.

6. The composition of claim 2, further comprising an elastomer.

7. The composition of claim 6, wherein the maleated polypropylene is in an amount in the range from about 0.5 to about 40 wt %, the amidoamine is in an amount from about 5 to about 30 wt %, and the polypropylene and elastomer together are in an amount from about 50 to about 93 wt %.

8. The composition of claim 5 wherein the composition is made by compounding polypropylene, a functionalized polypropylene, amidoamine and an elastomer in an extruder.

9. The composition of claim 6 wherein the composition is made by compounding polypropylene, maleated polypropylene, amidoamine and an elastomer in an extruder.

10. A process for making a composition, comprising: compounding polypropylene, a functionalized polypropylene and an amidoamine, such that the functionalized polypropylene and the amidoamine form a reaction product, wherein the amidoamine has the formula:

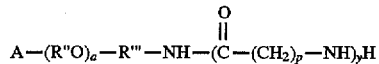

wherein:

A=B or D, and

B=R—O—(R'O)$_x$—

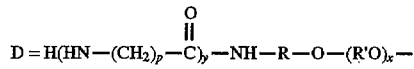

R is an alkyl of 1 carbon when A=B;

R' is an alkyl of 2 carbons when A=B;

R is a straight or branched alkyl of 0 to 3 carbon atoms when A=D;

R' is an alkyl group of 0 or 2 carbon atoms when A=D;

R" is a branched alkyl group of 3 carbon atoms;

R'" is a branched alkyl group of 3 carbon atoms;

a is independently 1 to 200:

x is independently 1 to 200 y is independently 1 to 300; and p is independently 2 to 11.

11. The process of claim 1 wherein the functionalized polypropylene is maleated polypropylene.

12. The process of claim 1 wherein the amidoamine is derived from the reaction of caprolactam and a polyetheramine selected from the group consisting of monoamines, diamines and triamines having a molecular weight of from about 148 to about 6000.

13. The process of claim 11 wherein the composition comprises from about 1 to about 90 wt % of polypropylene, from about 0.5 to about 10 wt % of maleated polypropylene and from about 1 to about 90 wt % of amidoamine.

14. The process of claim 11 wherein the composition further comprises an elastomer.

15. The process of claim 11 wherein the composition further comprises an elastomer.

16. The process of claim 15 wherein the composition comprises from about 0.5 to about 40 wt % of maleated polypropylene, from about 5 to about 30 wt % of amidoamine and from about 50 to about 93% of polypropylene and elastomer taken together.

17. The process of claim 14 wherein the process is carried out in an extruder.

18. The process of claim 15 wherein the process is carried out in an extruder.

19. The process of claim 18 wherein the extruder temperature is between about 240° C. and about 260° C.

20. A process for making a composition, comprising compounding polypropylene with the reaction product of a functionalized polypropylene and an amidoamine, wherein the amidoamine has the formula:

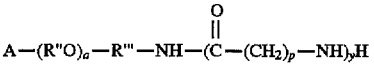

wherein:

A=B or D, and $B = R\text{—}O\text{—}(R'O)_x\text{—}$

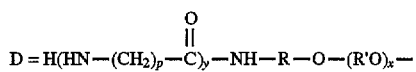

R is an alkyl of 1 carbon when A=B;
R' is an alkyl of 2 carbons when A=B;
R is a straight or branched alkyl of 0 to 3 carbon atoms when A=D;
R' is an alkyl group of 0 or 2 carbon atoms when A=D;
R" is a branched alkyl group of 3 carbon atoms;
R'" is a branched alkyl group of 3 carbon atoms;
a is independently 1 to 200;
x is independently 1 to 200
y is independently 1 to 300; and
p is independently 2 to 11.

21. The process of claim 20 wherein the functionalized polypropylene is maleated polypropylene.

22. The process of claim 20 wherein the amidoamine is derived from the reaction of caprolactam and a polyetheramine selected from the group consisting of monoamines, diamines and triamines having a molecular weight of from about 148 to about 6000.

23. The process of claim 21 wherein the composition comprises from about 1 to about 90 wt % of polypropylene, from about 0.5 to about 10 wt % of maleated polypropylene and from about 1 to about 90 wt % of amidoamine.

24. The process of claim 20 wherein the composition further comprises an elastomer.

25. The process of claim 21 wherein the composition further comprises an elastomer.

26. The process of claim 25 wherein the composition comprises from about 0.5 to about 40 wt % of maleated polypropylene, from about 5 to about 30 wt % of amidoamine and from about 50 to about 93% of polypropylene and elastomer taken together.

27. The process of claim 24 wherein the process is carried out in an extruder.

28. The process of claim 25 wherein the process is carried out in an extruder.

29. The process of claim 28 wherein the extruder temperature is between about 240° C. and about 260° C.

* * * * *